United States Patent
Hsien

(10) Patent No.: US 6,940,417 B2
(45) Date of Patent: Sep. 6, 2005

(54) WRENCH WITH TENSION METERS

(76) Inventor: Chin-Ching Hsien, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/818,127

(22) Filed: Apr. 6, 2004

(65) Prior Publication Data

US 2005/0140517 A1 Jun. 30, 2005

Related U.S. Application Data

(63) Continuation-in-part of application No. 10/213,400, filed on Aug. 7, 2002, now Pat. No. 6,784,799.

(51) Int. Cl.$^7$ ............................................. B25B 23/14
(52) U.S. Cl. ................. 340/668; 73/862.21; 81/125.1; 177/211
(58) Field of Search ................. 73/862.21, 862.23, 73/862.25, 862.27; 81/125.1; 340/668; 177/211

(56) References Cited

U.S. PATENT DOCUMENTS 4,775,018 A * 10/1988 Kroll et al. ................. 177/134
5,228,527 A * 7/1993 Kroll et al. ................. 177/211
6,463,811 B1 * 10/2002 Putney ..................... 73/862.21
6,766,700 B2 * 7/2004 Hsien ...................... 73/862.21
6,784,799 B2 * 8/2004 Hsien ........................ 340/668
2002/0178873 A1 * 12/2002 Hsieh ........................ 81/125.1
2004/0261542 A1 * 12/2004 Hsien ..................... 73/862.21

* cited by examiner

Primary Examiner—Jeffery Hofsass
Assistant Examiner—Anne V. Lai

(57) ABSTRACT

A wrench with tension meters comprises a handle; two ends of the handles installed clamping portions for receiving respective screwing elements; a center of the handle of the conductor having a first groove; two ends of the first groove near clamping portions being formed with respective second grooves; two connection groove being installed between the first groove and the second grooves, respectively; each connection groove serving for communicating the first groove and a respective one of the two second grooves; an integrated device installed in the first groove; and two tension meters installed in the two second grooves, respectively. The conductors are metals or metal wires.

3 Claims, 6 Drawing Sheets

WRENCH WITH TENSION METERS

The invention is a continuation in part (CIP) of U.S. patent Ser. No. 10/213,400 filed Aug. 7, 2002 now U.S. Pat. No. 6,784,799, which is invented and assigned to the inventor of the present invention. Thus, the content of the invention, U.S. patent Ser. No. 10/213,400, is now incorporated into the present invention as a part of the present invention.

FIELD OF THE INVENTION

The present invention relates to wrenches, and particular to a spanner with tension meters.

BACKGSEMI-ROUND OF THE INVENTION

When operating a wrench, the user can only estimate the tension of the wrench by experience. Further, it is not accurate to estimate the tension of the wrench by experience. When applied an excessively high torsional force to the wrench, the wrench may be force to break, causing an accident. In order to eliminate this problem, wrenches with tension indicators are developed. FIGS. 4 and 5 show two ratchet wrenches with electronic type tension indicator means according to the prior art. Because the electronic type tension indicators occupies much installation space, the installation of the electronic type tension indicator means affects the convenience of the operation of the wrench. Further, because the electronic type tension indicator means is disposed outside the wrench, it tends to be damaged accidentally.

SUMMARY OF THE INVENTION

Accordingly, the primary object of the present invention is to provide a wrench with tension meters which comprises a handle; two ends of the handles having clamping portions for receiving respective screwing elements; a center of the handle of the conductor having a first groove; two ends of the first groove near clamping portions being formed with respective second grooves; two connection groove being installed between the first groove and the second grooves, respectively; each connection groove serving for communicating the integrated device and a respective one of the two tension meters; an integrated device installed in the first groove; and two tension meters installed in the two second grooves, respectively. The conductors are metals or metal wires.

The various objects and advantages of the present invention will be more readily understood from the following detailed description when read in conjunction with the appended drawing.

BRIEF DESCRIPTION OF THE DRAWINGS

FIG. 3-1 is a schematic view of the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
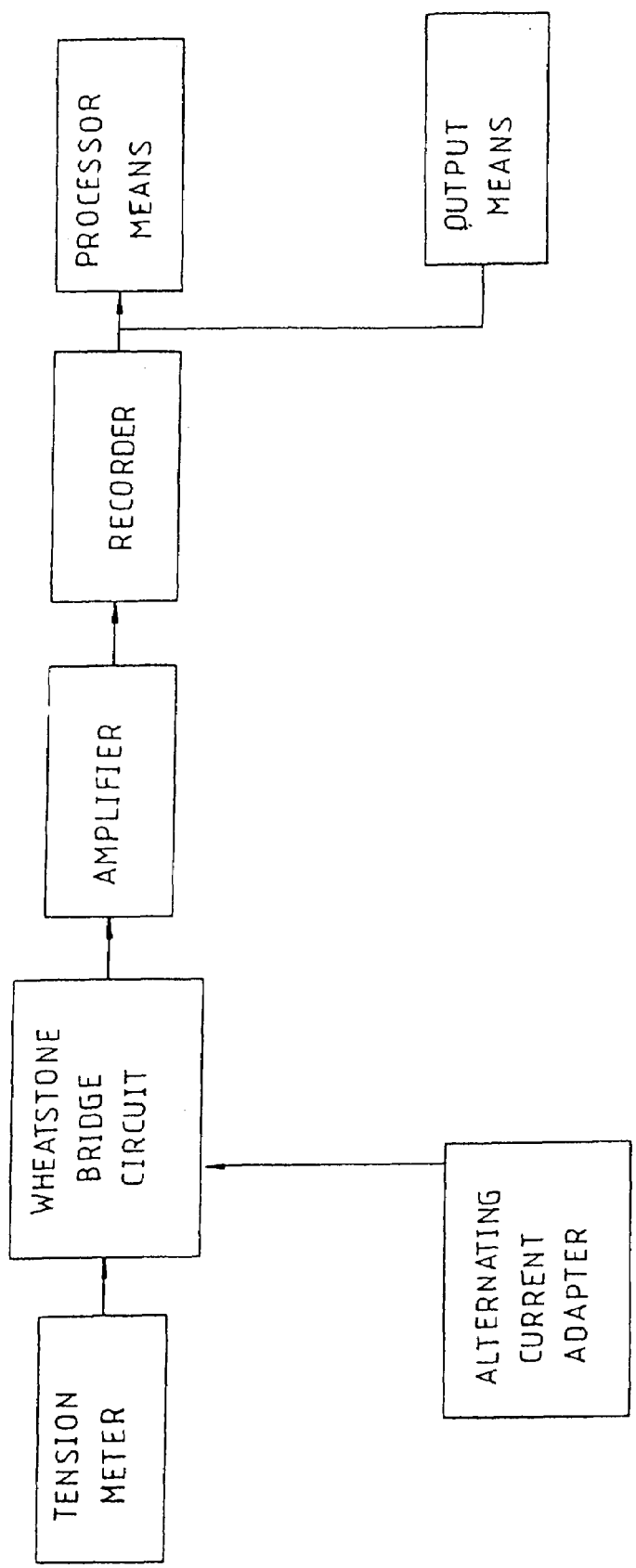
FIG. 1 is a circuit block diagram of the present invention.
Figure 2:
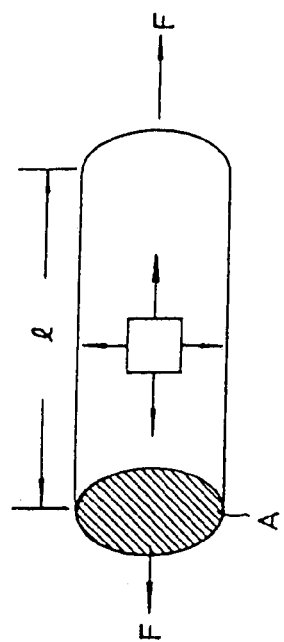
FIG. 2 is a schematic view showing the condition of the materials when suffering from a torsional force.
Figure 2:
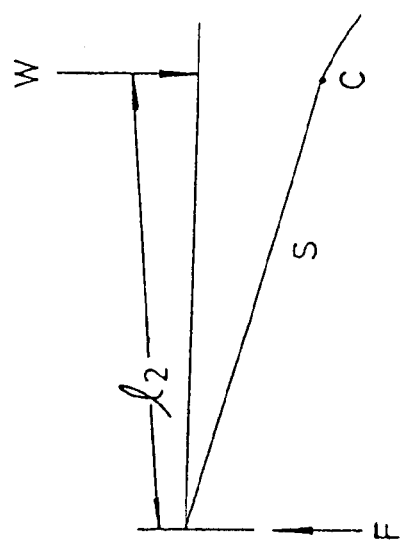
Figure 2:
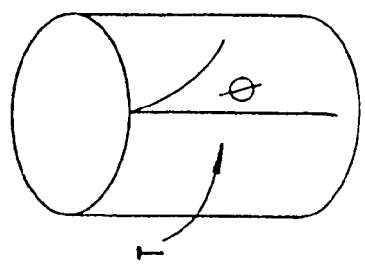

FIG. 1 shows the circuit design of the present invention. FIG. 2 explains the circuit design of the present invention, in which S: length of arc; 12: length of the force receiving unit; C: bearing point. When received the load F, S>$\delta$2, a tension is produced to deform the tension meter 20, thereby causing Wheatstone Bridge Circuit to provide a voltage output indicative of the amount of deformation of the tension meter 20. As shown in FIG. 1, when the cylinder bears a torque T, it produced an angular change and changes the voltage output, therefore, R=p×1/A in which, R: resistance; 1: length; A: unit area; p: coefficient of resistance. According to this equation, resistance value is directly proportional to unit length, but indirectly proportional to unit area. The output voltage signal from Wheatstone Bridge Circuit is then amplified through Amplifier, and then recorded by Recorder, and then converted from analog signal into digital signal by Processor Means for outputting through Output Means, namely, the aforesaid display screen 31.

Figure 3:
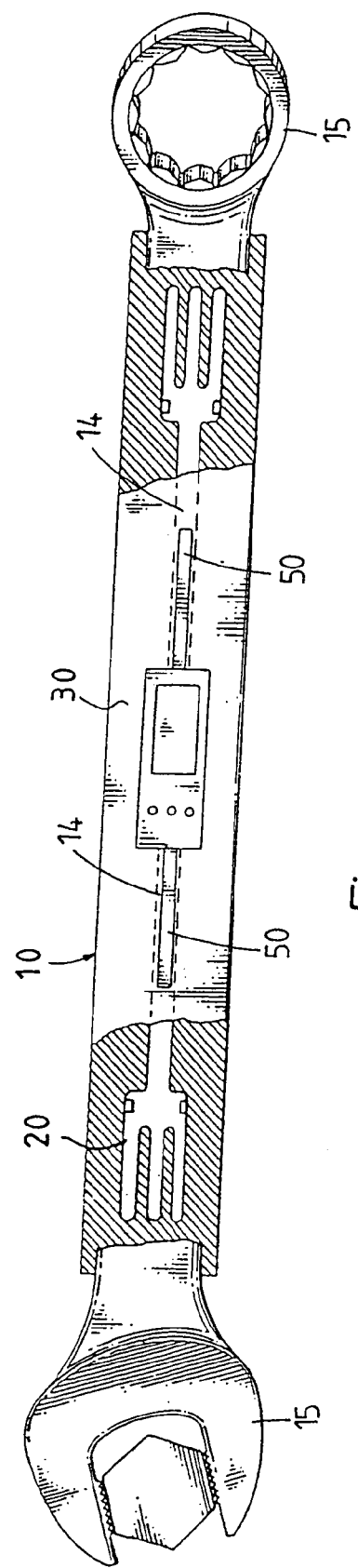
FIG. 3 is a perspective view of the present invention.
Figures 1, 3:
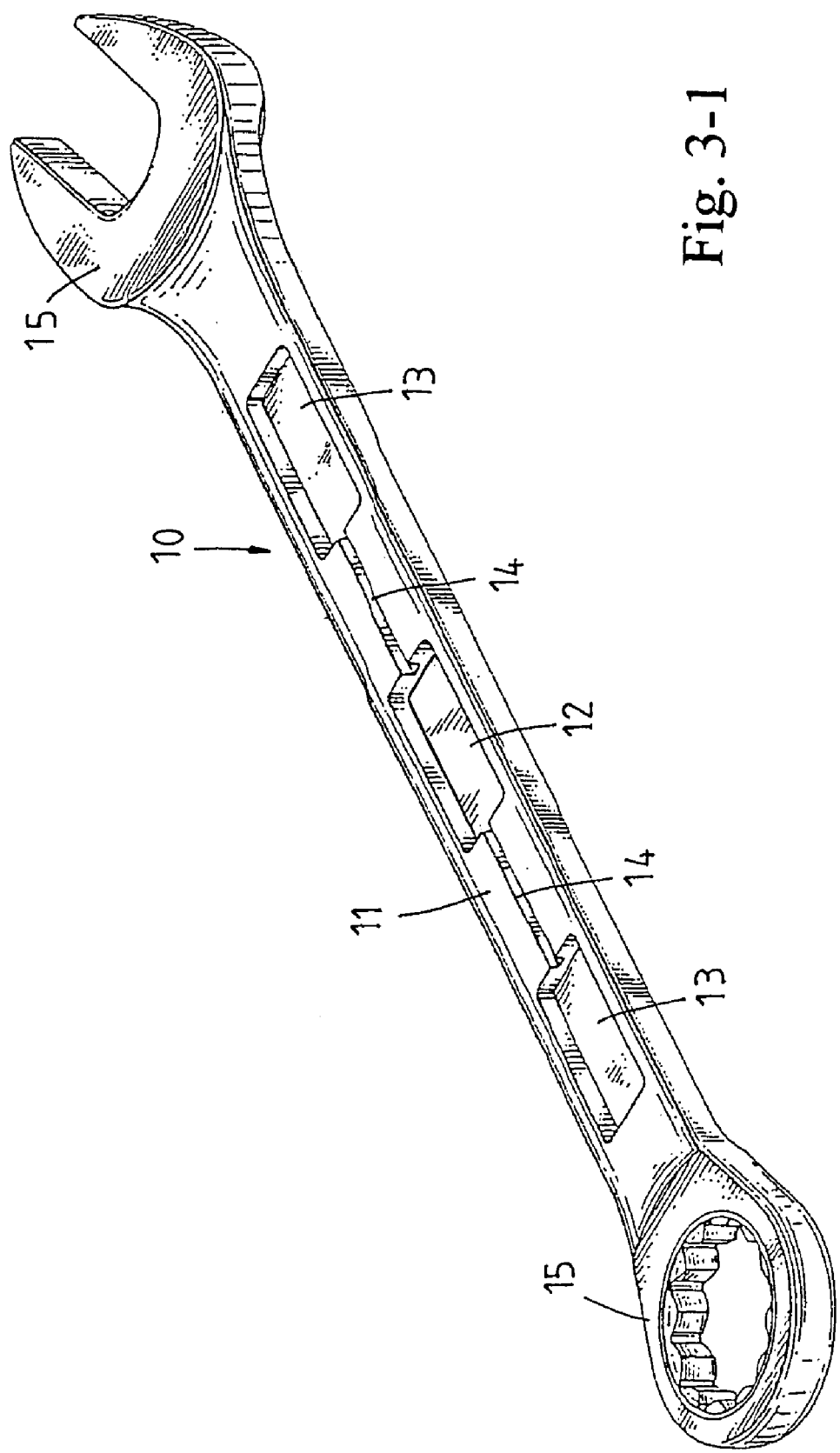
Figure 4:
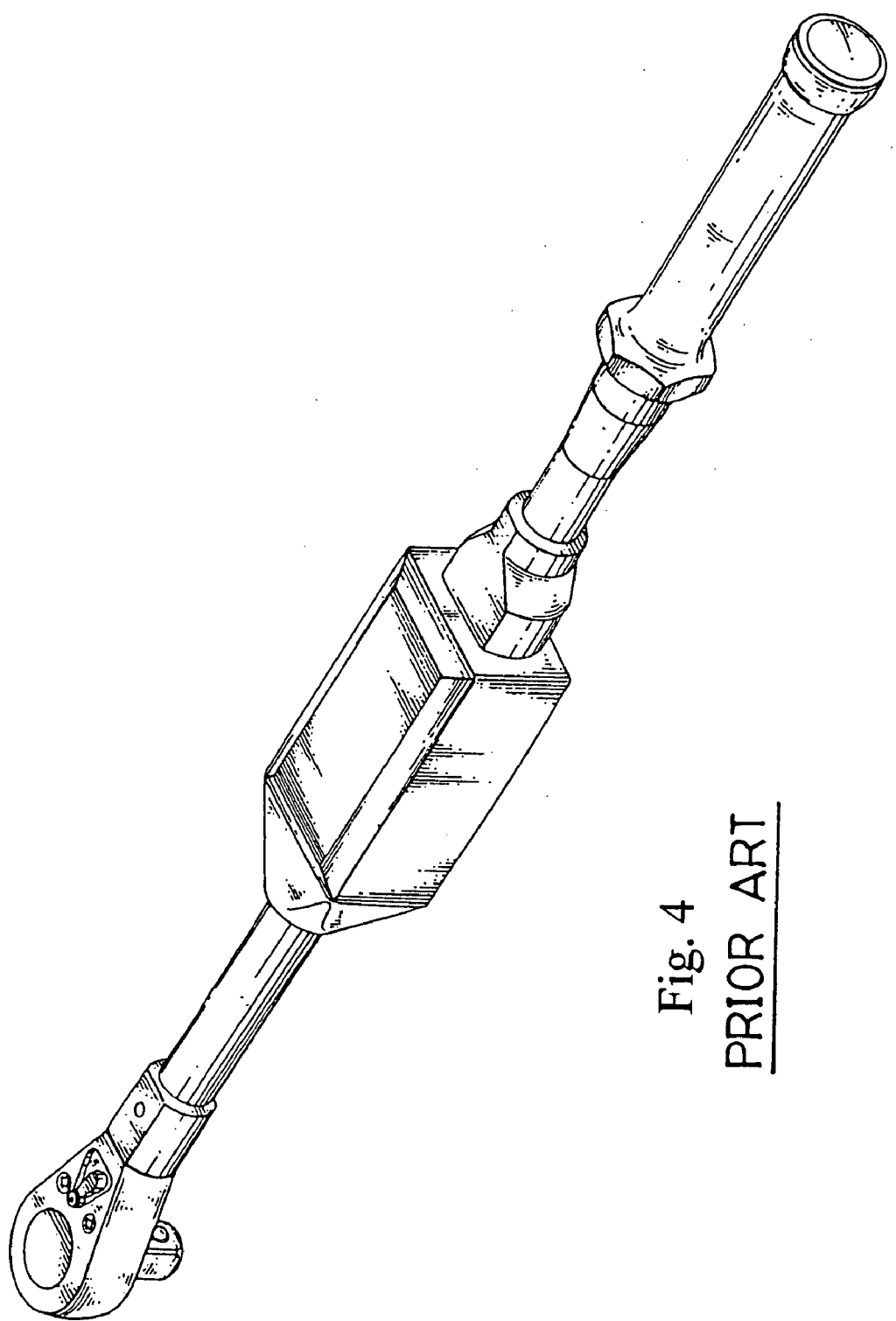
FIG. 4 is a perspective view of a wrench with electronic tension display means according to the prior art.
Figure 5:
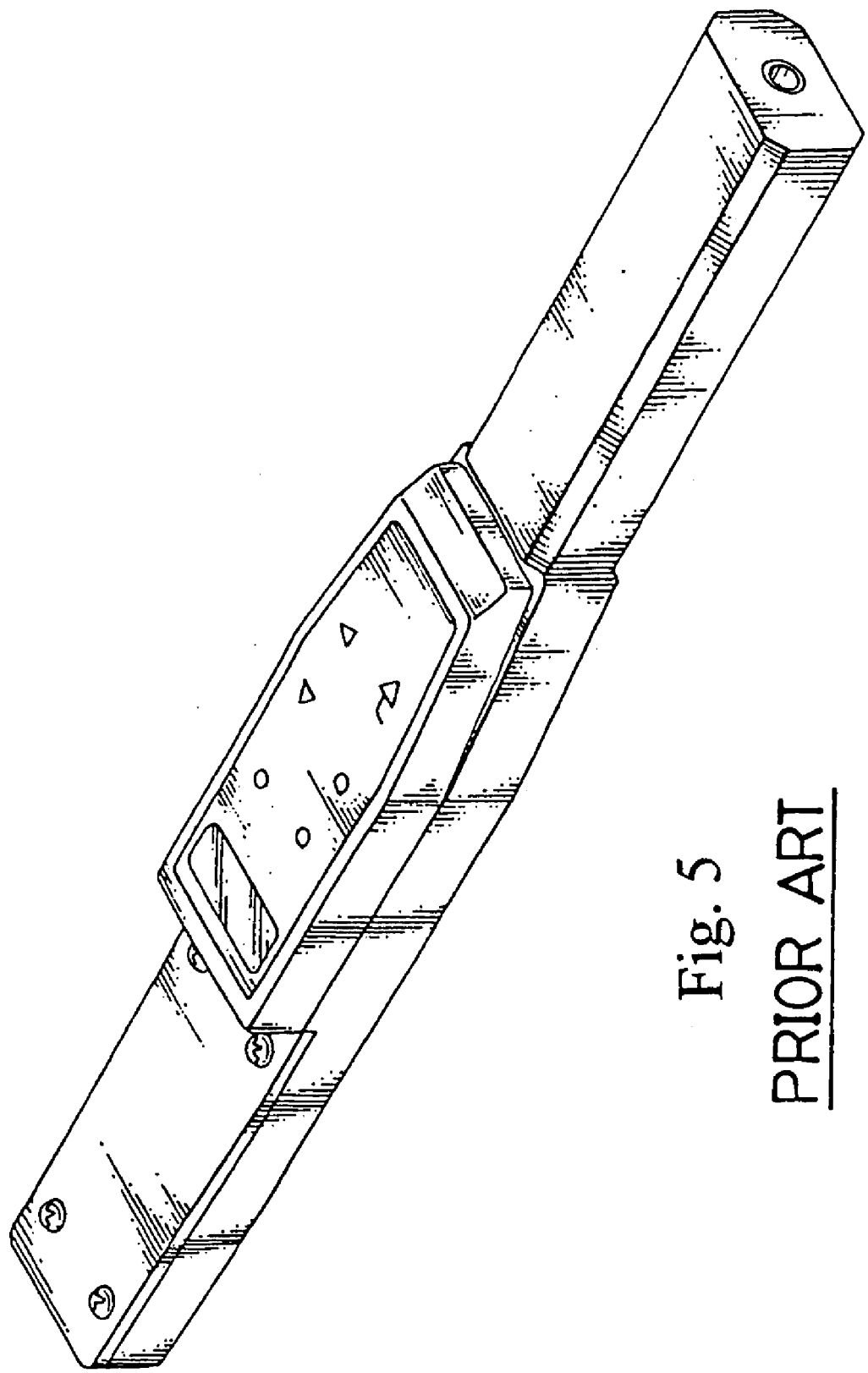
FIG. 5 is a perspective view of a wrench with photosensitive type electronic tension display means according to the prior art.

With reference to FIG. 3, a center of a handle 11 of a wrench 10 is installed with an integrated device 30. Two ends of the handle 11 have respective clamping portions 15. Each end of the handle 11 has a tension meter 20 near the clamping portion 15. Between the tension meter 20 and the integrated device 30 has a conductor 50. The conductor 50 may be a metal or a conductive wire. Referring to FIG. 3-1, a schematic perspective view of FIG. 3 is illustrated. A center of the handle 11 of the conductor 50 has a first groove 12. Two ends of the first groove 12 near clamping portions 15 are formed with respective second grooves 13. A connection grooves 14 are installed between the first groove 12 and the second grooves 13. The first groove 12 serves to place the integrated device 30 and the second grooves 13 serve to place the tension meters 20. The conductors 50 are placed in the connection grooves 14 so as to communicate the tension meters 20 and the integrated device 30. The first groove 12 and second grooves 13 have the effect of protecting the integrated device 30 and the tension meters 20. Thereby, the handle 11 of the wrench 10 has a flat appearance. More importantly, the tension meters 20 are placed in the second grooves 13. This will increase the sensitivity of the tension meters 20. Furthermore, the tension meters 20 and the integrated device 30 are movably buckled in the first groove 12 and second groove 13. Thereby, the tension meters 20 or the integrated device 30 can be maintained or updated easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wrench with tension meters comprising:

a handle; two ends of the handles having clamping portions for receiving respective screwing elements; a center of the handle of the conductor having a first groove; two ends of the first groove near clamping portions being formed with respective second grooves; two connection groove being installed between the first groove and the second grooves, respectively; each connection groove serving for communicating the second groove and a respective one of the two second grooves;

an integrated device installed in the first groove;

two tension meters installed in the two second grooves, respectively; and two conductors installed in the two connection grooves, respectively for communicating the integrated device and the two tension meters.

2. The wrench with tension meters as claimed in claim 1, wherein the conductors are metals.

3. The wrench with tension meters as claimed in claim 1, wherein the conductors are metal wires.

* * * * *